(12) United States Patent
Molnár

(10) Patent No.: US 10,647,376 B2
(45) Date of Patent: May 12, 2020

(54) COLLAPSIBLE FLIP-PIVOT BICYCLE

(71) Applicant: Ferene Molnár, Budapest (HU)

(72) Inventor: Ferene Molnár, Budapest (HU)

( * ) Notice: Subject to any disclaimer, the term of this patent is extended or adjusted under 35 U.S.C. 154(b) by 0 days.

(21) Appl. No.: 15/565,423

(22) PCT Filed: Apr. 7, 2016

(86) PCT No.: PCT/HU2016/000018
§ 371 (c)(1),
(2) Date: Oct. 10, 2017

(87) PCT Pub. No.: WO2016/162707
PCT Pub. Date: Oct. 13, 2016

(65) Prior Publication Data
US 2018/0127049 A1 May 10, 2018

(30) Foreign Application Priority Data

Apr. 9, 2015 (HU) .................................. 1500155

(51) Int. Cl.
*B62K 15/00* (2006.01)
*B62M 17/00* (2006.01)
*B62K 25/00* (2006.01)

(52) U.S. Cl.
CPC .......... *B62K 15/008* (2013.01); *B62K 25/005* (2013.01); *B62M 17/00* (2013.01)

(58) Field of Classification Search
CPC ..... B62K 15/008; B62K 25/005; B62M 17/00
See application file for complete search history.

(56) References Cited

U.S. PATENT DOCUMENTS 1,584,568 A * 5/1926 Haskell ................ B62K 15/006
280/278
3,015,498 A * 1/1962 Tanaka ................. B62K 15/006
280/278

(Continued)

*Primary Examiner* — Joseph M Rocca
*Assistant Examiner* — Michael R Stabley
(74) *Attorney, Agent, or Firm* — Sarika Singh; McNeely, Hare & War LLP

(57) ABSTRACT

The flip-pivot bicycle is a collapsible bicycle, that can be folded by a new method, and belongs into the class of the bicycles foldable about two or more axes. The flip-pivot bicycle consists of a driving-frame-segment (1) comprising the driving-wheel (7), a steering-frame-segment (3), comprising the steering-wheel (6), and a central-frame-segment (2), which connects them. The central-frame-segment (2) and the driving-frame-segment (1) is connected by and can pivot above a pivot-axis (4), which pivot-axis (4) is perpendicular to the plane of the parallelly positioned wheels (6, 7), or forms an angle of maximum 45 degree with this perpendicular. The central-frame-segment (2) and the steering-frame-segment (3) is connected and can pivot by a flip-axis (5), which flip-axis (5) is in the plane of the parallelly positioned wheels (6, 7), or is parallel to this plane, or forms an angle of maximum 45 degree with this plane. The function of the flip-axis (5) is to relocate the wheel distant to the pivot-axis (4) as close (or approximately as close) to the pivot-axis (4) as the other wheel is. Thereby flipping the driving-frame-segment (1) on the central-frame-segment (2) by the flip-axis (5), and offset the original planes of the wheels (6, 7) in the meantime, the two wheels (6, 7) can be folded next to each-other. Beyond the above, the flip-pivot bicycle can be equipped with an extra frame-brace; with central-suspension; with crank-anus with releasable fixing which can be re-fixed also in less than 180 degree to each-other, and/or the with pedals inward; with stem that can be slided into one of the forks or next to it; and with seatpost miming out of the plane of the driving wheel.

19 Claims, 7 Drawing Sheets

(56) References Cited

U.S. PATENT DOCUMENTS

| | | | | |
|---|---|---|---|---|
| 4,022,485 A * | 5/1977 | Cox | B62K 15/006 | 280/287 |
| 4,182,522 A * | 1/1980 | Ritchie | B62K 15/008 | 280/278 |
| 6,267,401 B1 * | 7/2001 | De Jong | B62K 15/008 | 280/287 |
| 6,688,625 B1 * | 2/2004 | Schreuder | B62K 15/008 | 280/260 |
| 6,880,848 B2 * | 4/2005 | Liu | B62K 15/008 | 280/278 |
| 6,942,235 B2 * | 9/2005 | Chang | B62K 15/00 | 280/278 |
| 6,979,013 B2 * | 12/2005 | Chen | B62K 15/008 | 280/278 |
| 7,229,089 B2 * | 6/2007 | Mihelic | B62K 15/008 | 280/278 |
| 7,232,144 B2 * | 6/2007 | Colman | B62K 15/008 | 280/220 |
| 7,591,473 B2 * | 9/2009 | Tak-Wei Hon | B62K 15/008 | 280/278 |
| 8,123,243 B2 * | 2/2012 | Ho | B62K 15/008 | 280/278 |
| 8,205,902 B2 * | 6/2012 | Uimonen | B62K 15/008 | 280/278 |
| 8,430,414 B1 * | 4/2013 | Yap | B62K 15/008 | 280/278 |
| 8,882,124 B2 * | 11/2014 | Yap | B62K 15/006 | 280/278 |
| 8,894,084 B1 * | 11/2014 | Yap | B62K 15/008 | 280/278 |
| 9,346,514 B2 * | 5/2016 | Thompson | B62K 15/008 | |
| 9,457,864 B2 * | 10/2016 | Bailie | B62K 3/02 | |
| 2002/0167151 A1 * | 11/2002 | Tseng | B62K 15/008 | 280/287 |
| 2003/0114274 A1 * | 6/2003 | Chang | B62K 15/008 | 482/57 |
| 2007/0205577 A1 * | 9/2007 | Lau | B62K 15/008 | 280/287 |
| 2011/0109059 A1 * | 5/2011 | Dumaresq | B62K 3/10 | 280/278 |
| 2015/0021876 A1 * | 1/2015 | Hartmann | B62K 15/008 | 280/259 |
| 2016/0016628 A1 * | 1/2016 | Thompson | B62K 15/008 | 180/220 |
| 2016/0016630 A1 * | 1/2016 | Thompson | B62K 15/008 | 280/287 |
| 2016/0144925 A1 * | 5/2016 | Wang | B62K 21/16 | 280/261 |
| 2016/0244120 A1 * | 8/2016 | Gerencser | B62K 15/008 | |

* cited by examiner

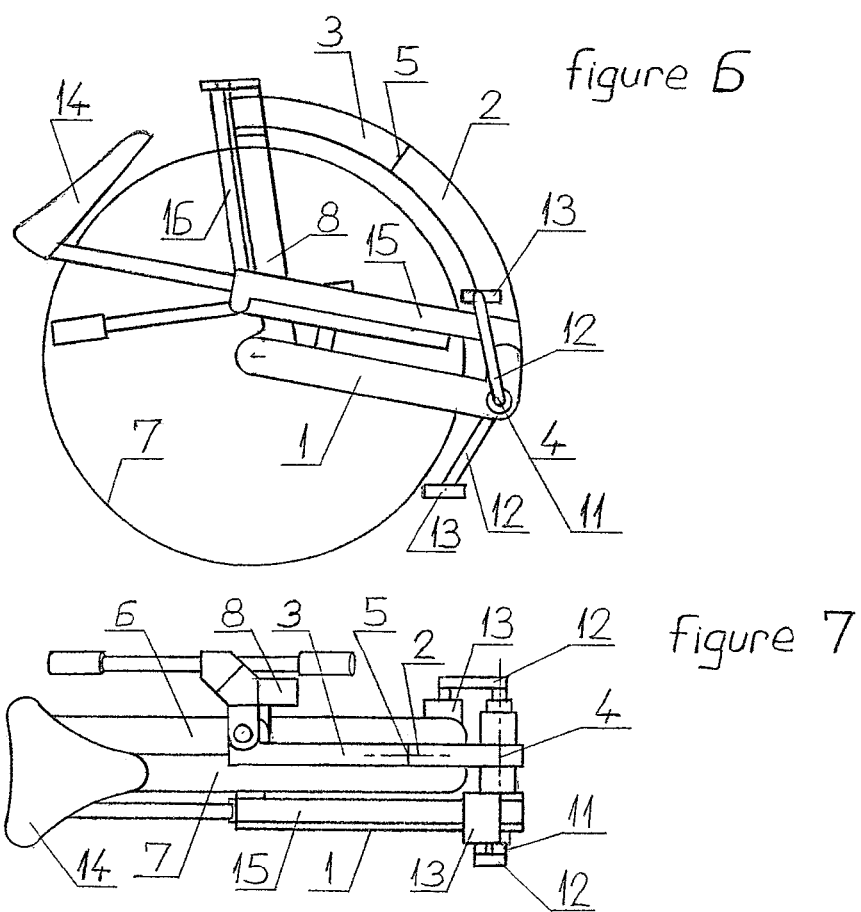

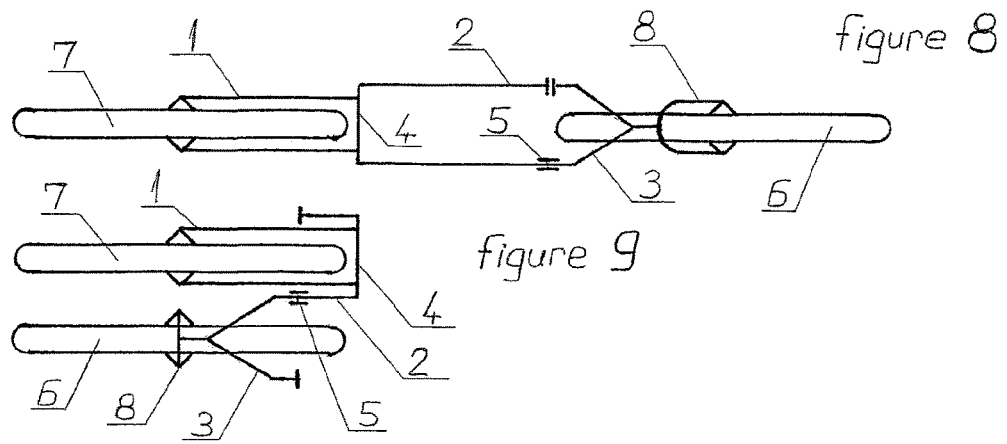
figure 8
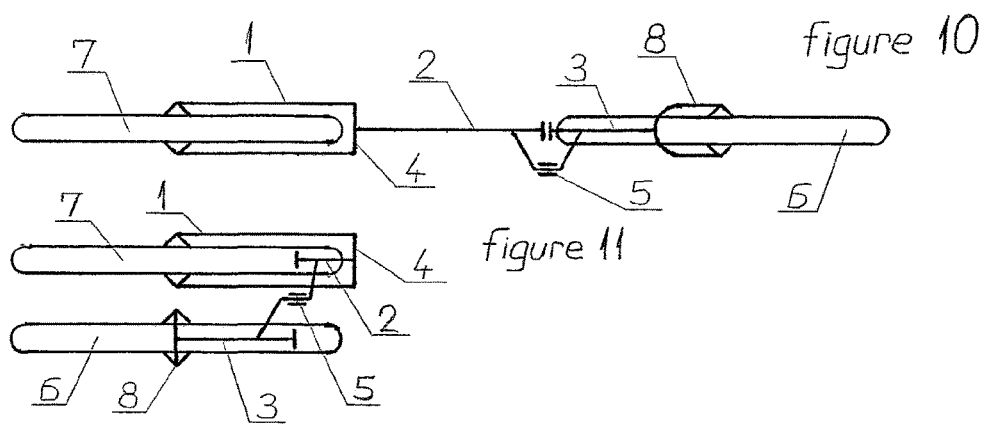
figure 9
figure 10
figure 11
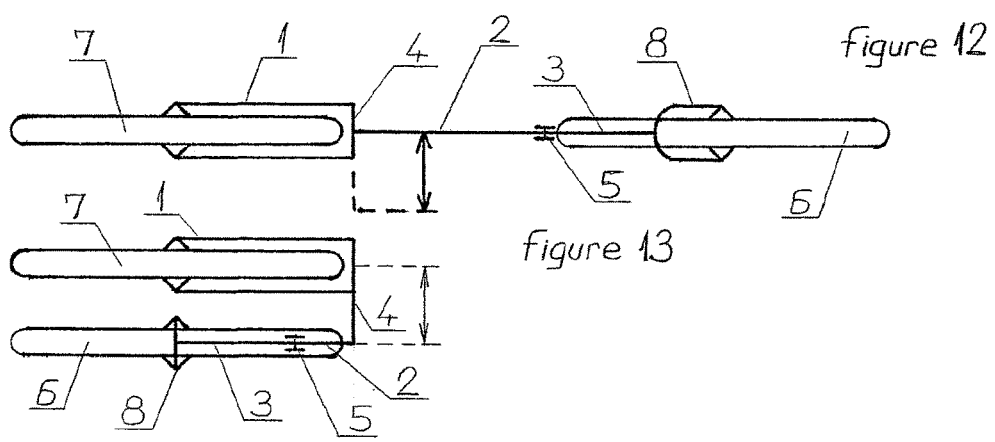
figure 12
figure 13
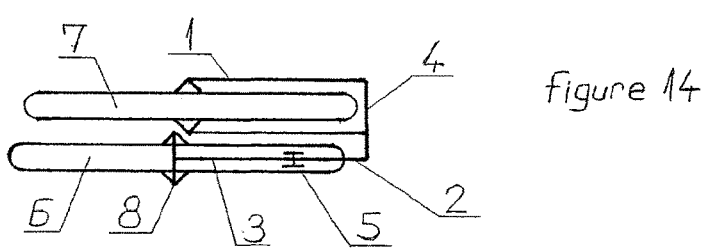
figure 14

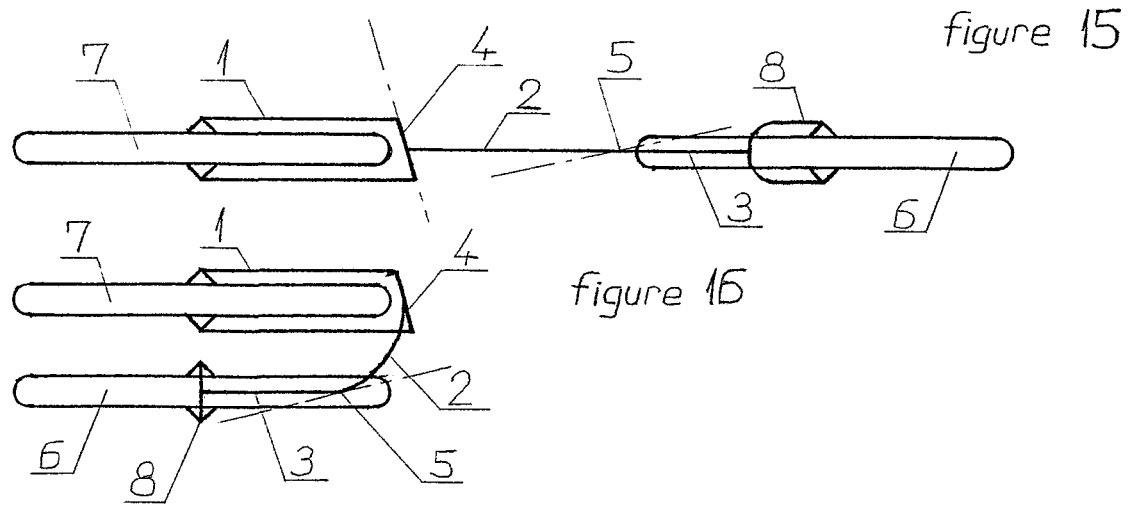
figure 15
figure 16
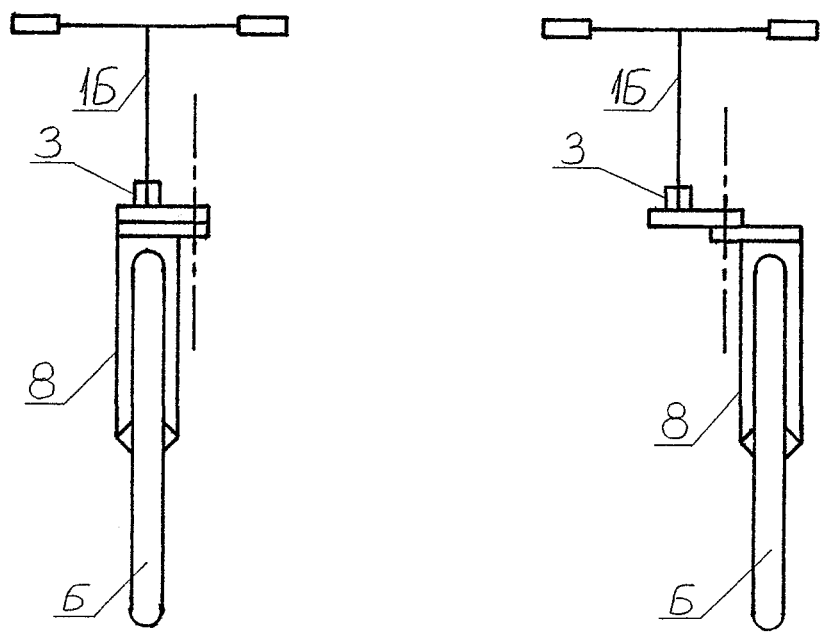
figure 17
figure 18

COLLAPSIBLE FLIP-PIVOT BICYCLE

CROSS-REFERENCE TO RELATED APPLICATIONS

This application is a National Phase Application under 35 USC 371 of PCT/HU2016/000018, filed Apr. 7, 2016 (published as WO 2016/162707) and claiming priority to Hungarian patent application no. P1500155, filed on Apr. 9, 2015. The disclosure of the prior applications are considered part of and is incorporated by reference in their entirety in the disclosure of this application.

CLASSIFICATION OF THE INVENTION

Bicycle collapsible about two or more axes.

RELEVANT EXISTING TECHNICAL SOLUTIONS

The most common method of collapsing a bicycle is when the bicycle is folded in half about an axis roughly perpendicular to the ground, by the hinge placed on the frame. This method is typically—but not exclusively—applied in the smaller size (20-inch or less wheel-diameter) bicycles. The disadvantage of this method, that it results not the most compact size (since the distance of the folding axis to the periferic of the distant wheel is minimum the half of the distance between the periferics of the wheels), and this method is not optimal in terms of rigidity either, as significant static and dynamic forces arise where the folding hinge is. Lot of manufacturers offer bicycles with this folding method.

The larger bikes are very rarely is offered in collapsible deign. If so, the typical folding method of them is that the complete rear/drinig-wheel assembly can be flipped sideways forward along the axis of the seatpost.

The disadvantage of this method is, that in order to achieve the most compact size the steering-wheel has to be dismounted and re-mounted to the folded frame. (e.g. EP0080792 B1).

Beyond the above, there are also folding bicycles flipping over underways (e.g. EP0026800 B1), where the complete rear/driving-wheel assembly can be flipped underways forward along the axis of the crank-shaft (or nearby to it) to beneath the main-frame and right behind the steering-wheel, and the steering-wheel can folded back sideways by a hinge next to the flipped rear-wheel. Disadvantage is that it can be applied to only with small wheel sizes, and the main-frame has to run relatively high, since the flipped rear-wheel has to fit beneath the main-frame.

An also commonly known collapse method, when the bike frame is an upwardly open arc (possibly bending back on the wheels on one or both ends with inflexion point(s)) with the radius more of the wheels, where the wheels can be flipped up inside the frame arc at the ends of the arc (or at the inflexion point(s)) along two axes which are parallel to the closest section of the wheels' periferics, but offset to each-other in two different planes.

The disadvantage of this method is that flipping axis of the rear/driving-wheel assembly is relatively far from the ergonomically ideal point of the crankshaft, hence the rear/driving-wheel assembly has to have a bigger own frame where the crankshaft can positioned ideally, otherwise the construction is suit for electric drive the most. (e.g. WO 2011029750 A1).

In addition to the above common folding methods, there are lot of folding bikes with very complex, complicated and expensive folding mechanisms.

In addition to, in the most of the folding bikes, the frame of the rear/driving-wheel and the headset are connected with a single frame-tube only, which results in less rigidity of the bike, or requires heavy reinforcement with additional weight and cost.

CHALLENGE OF THE INVENTION

The subject of the invention is a collapsible bicycle, foldable about multiple axes, hereinafter referred as flip-pivot bicycle which is foldable by a new method, and have the following benefits:
- Can be folded simpler and in more compact size, particularly—but not exclusively—in bigger wheeled bicycles (above 20-inch wheel diameter, e.g. in 24-, 26- and 28-inch sizes), making them easier transportable either on public transport vehicles, or in car trunks.
- Collapsible ergonomically/comfortably without the removal of the front wheel.
- The folding method is applicable even with one- or two-side fork wheel-suspension.
- In addition, the bicycle can be equipped with an extra frame-brace without impede the folding process, thus providing higher mechanical strength to the structure without significant additional weight.

SOLUTION IN ACCORDANCE WITH CLAIMS

The collapsible flip-pivot bicycle is a bicycle foldable about multiple axes, which consists of three rigid-itself frame-segments, i.e.
- the steering-frame-segment (3), comprising turnably the steering wheel assembly including i.e. the stem (16), the fork/forks (8) and the steering-wheel (6),
- the driving-frame-segment (1) comprising the driving-wheel (7),
- and the central-frame-segment (2), which connects the driving-frame-segment (1) and the steering-frame-segment (3)

characterized in that
the central-frame-segment (2) and the driving-frame-segment (1) are connected to each-other pivotably above a pivot-axis (4), which pivot-axis (4) is perpendicular to the plane of the parallelly positioned wheels (6, 7), or forms an angle of maximum 45 degree with this perpendicular, and the central-frame-segment (2) and the steering-frame-segment (3) are connected to each-other turnably along a flip-axis (5), which flip-axis (5) is in the plane of the parallelly positioned wheels (6, 7), or is parallel to this plane, or forms an angle of maximum 45 degree with this plane. (FIGS. 1-3 and FIGS. 4-7)

The function of the flip-axis (5) is to relocate the wheel distant to the pivot-axis (4) (Typically the steering wheel (6)) as close (or approximately as close) to the pivot-axis (4) as the other wheel (Typically the driving-wheel (7)) is. (FIG. 2)

Consequently, the flip-axis (5) is approximately the median-perpendicular of the centers of the unfolded and desired folded positions of the flipped wheel (Typically the steering wheel (6)).

Based on the above, theoretically the flipped wheel can be relocated anywhere on a circle concentric to the pivot-axis (4) with the radius equal (or close to equal) to the distance of the other wheel, as can have infinite position on this circle.

However in the most ideal case, the folded and the unfolded positions of the flipped wheel do not intersect each-other, but are the closest to each other as much as possible, thus the flip-axis (5) is the closest to the periferic of the wheel, resulting the most compact folded dimension.

Coaxiality of the Wheels when Folded:

Depending on whether the flip-axis (5) relocates the wheel distant to the pivot-axis (4) exactly as close to the pivot-axis (4) as the other wheel is, or just near as close, the axes of the wheels in folded state are coincident or not.

The coaxiality of the folded wheels results better maneuverability, but less compact size due to that the widest point of a bicycle wheel is typically at its axis.

Therefore, the slightly not coaxial position of folded wheels is also a considerable design solution. (FIG. 14.)

Offset of the Plane of the Wheels During Folding:

If the flip-axis (5) were in the plane of the parallelly positioned wheels (6, 7), and the pivot-axis (4) were perpendicular to it, and the central-frame-segment (2), were not possible to be offset to the driving-frame-segment (1) along the pivot-axis (4), then the bicycle could not be folded, as the in the folded position the wheels were in the same plane.

To eliminate this above coincidency, one of the following solutions or a combination of them is needed:

One of the fundamental solution is to offset the flip-axis (5) from the plane of the parallelly positioned wheels (6, 7). For this purpose the following solutions or a combination of them is needed:

The flip-axis (5) is inside the frame segments (2, 3), but the frame segments (2, 3) or the section of them where the flip-axis (5) is located is outside of the plane of the parallelly positioned wheels (6, 7). This asymmetrical design imply some torsion load on the frame but it is not significant. (FIGS. 4-7)

The flip-axis (5) is out of the plane of the parallelly positioned wheels (6, 7), and the frame segments (2, 3) or the section of them where the flip-axis (5) is located is duplicated, and one of the frame-branches incorporates the pivoting flip-axis (5), while while the other frame-branch is designed with releasably fixed connection (e.g. with releasable fast-lock or releasable latch) at the connection of the frame segments (2, 3). (FIGS. 8 and 9)

The flip-axis (5) is out of the plane of the parallelly positioned wheels (6, 7), but where the central-frame-segment (2), and the steering-frame-segment (3) are align with that plane. (The flip-axis (5) does not have statical role when the bicycle is unfolded, and when the statical and dynamic loads are beared by the releasably fixed connection (e.g. with releasable fast-lock or releasable latch) which connects the central-frame-segment (2) and the steering-frame-segment (3). This case the flip-axis (5) should be designed only for the statical loads arising during the folding of the bike. (FIGS. 10 and 11)

The central-frame-segment (2) and the driving-frame-segment (1) which are connected by and can pivot above the pivot-axis (4), can be offset along the pivot-axis (4). (FIGS. 12-13)

The flip-axis (5) forms an angle of 0-45 degree with the plane of the parallelly positioned wheels (6, 7) and/or pivot-axis (4) forms an angle of 0-45 degree with the perpendicular of this plane, thus the plane of the steering-wheel (6) will move out of the plane of the driving-wheel (7) during the folding process. (FIGS. 15 and 16)

The steering-wheel (6) is designed to be pivotable along an axis which is out of the plane of the steering-wheel (6) itself, which axis can be e.g. one of the forks (8), when the fork-crown item which connects the forks (8) to the stem (16) consist of two releasably fixed parts splitted horizontally. (FIGS. 17 and 18)

Naturally the one-side fork (8) suspension results more compact folded size. (FIGS. 4-7)

Extra Frame-Brace (9)

The rigidity of the flipping-pivoting bicycle can be enhanced by an extra frame-brace (9) which connects the driving-frame-segment (1) either with the central-frame-segment (2), or with the steering-frame-segment (3), with hinge or tenon connection on the one end, and releasably fixed connection (e.g. releasable fast-lock or releasable latch) on the other or on both ends.

The complementary frame-brace (9) can be fixed to the driving-frame-segment (1) in multiple positions on the alternative frame-brace fixing points (10), and/or can consist of two or more longitudinally telescoping pieces sliding into or side-by each-other. Thus the distance between the seatpost (15) and the stem (16) can be varied in wide range giving significant flexibility to set the most comfortable seating position.

The extra frame-brace (9) can serve for fixing of the saddle (14), or of the structure incorporating the saddle (14), or of the seatpost (15). (FIGS. 19-20)

Central Suspension

Beside the basic rigid connection of the central-frame-segment (2) and the driving-frame-segment (1) of the unfolded bicycle, the bicycle can be equipped with central suspension, where the flexible-item can be either at the pivot-axis (4) or incorporated in the extra frame-brace (9), and this flexible-item can be de-activated during the folding of the bike above the pivot-axis (4).

The central suspension can substitute and eliminate the necessity of the normal spring item(s) in the fork(s) (8) of the steering-wheel (6).

Location of the Drive Shaft (11)

Ideally the crank-shaft (11) is located on the driving-frame-segment (1) even—but not necessarily—in align with the pivot-axis, as in this case the crank-shaft (11) distance to the axis of the driving-wheel (7) does not change during the folding. (FIGS. 4 to 7 and FIGS. 19-20)

If the crank-shaft (11) is located on the central-frame-segment (2) it's distance to the axis of the driving-wheel (7) varying during the folding, which can be compensated with one of the following solutions:

In case of chain drive, the drive can be transmitted in two stages through an ancillary chain-wheel which axis is coaxial with the pivot-axis (4).

In case of chain drive, the other solution is to apply a derailleur with the necessary flexibility to compensate the varying distance during the folding.

In case of Cardan-shaft drive the shafts have to be telescopic, and is preferred to be inline with each-other when the bicycle is unfolded to eliminate the sinusoidal transmission of the Cardan-drive when the shafts are in angle.

Shape of the Frame-Segments (1, 2, 3)

Ideally in order of the most compact collapsed size, the frame-segments (1, 2, 3) in the collapsed state should follow (lean on) as closely as possible the arc of the wheels.

Of course, the frame-segments (1, 2, 3) can be straight/angular as well, while keeping in mind the ideal position of the flip-axis (5).

Pedals (13) and Crank-Arms (12)

In normal condition, the crank-arms (12) mounted on two sides of the common crank-shaft (11), are in 180 degrees to each-other, and the pedals are mounts outward on the outside of their respective crank-arm (12).

However, more compact folding size is achievable when the crank-arms (12) can be mounted to the crank-shaft (11) even in less than 180 degrees to each-other, by using releasable fast-lock fixing.

It is also expedient in order of the most compact size, when one or both crank-arms (12) can be mounted to the crank-shaft (11) even with pedals (13) inward, and/or one or both pedals (13) can be re-fixed on the inside of the respective crank-arm (12) by using releasable fast-lock fixing. (FIGS. 6 and 7)

Saddle (14) and its Fixing

In order to further decrease the folded size of the bicycle, the seatpost (15) may run even out of the plane of the parallelly positioned wheels (6, 7), and can be fixed to the driving-frame-segment (1), and/or to the central-frame-segment (2), and/or to the extra frame-brace (9).

Collapse of the Stem (16)

In order of the compact size the stem (16) either
can be folded down side by the wheel in the usual way by a hinge approximately perpendicular to the stem (16) and in an angle of 45-degree to the plane of the steering-wheel (6), or
if the stem (16) is running out of the plane of the steering-wheel (6) it is slidable by along its own axis into one fork (8) of the steering-wheel (6) or next to it. (FIGS. 21-24)

LIST OF THE ATTACHED FIGURES WITH DENOMINATION OF THE TAGS

The item numbers in drawing names:
1. Driving-frame-segment
2. Central-frame-segment
3. Steering-frame-segment
4. Pivot-axis
5. Flip-axis
6. Steering-wheel
7. Drive-wheel
8. Fork
9. Frame-brace (fixed or variable length)
10. Frame-brace-alternative-fixing-points
11. Crank-shaft
12. Crank-arm
13. Pedal
14. Saddle
15. Seatpost
16. Stem

BRIEF DESCRIPTION OF THE DRAWINGS

FIG. 8, 9: Schematic figure showing a sub-claim about one possible way of offset the plains of the wheels.

FIG. 10, 11: Schematic figure showing a sub-claim about one possible way of offset the plains of the wheels.

FIG. 12, 13: Schematic figure showing a sub-claim about one possible way of offset the plains of the wheels.

FIG. 14: Schematic figure showing the benefit of the non-coaxially positioned wheels in collapsed status.

FIG. 15, 16: Schematic figure showing a sub-claim about one possible way of offset the plains of the wheels.

FIG. 17, 18: Schematic figure showing a sub-claim about one possible way of offset the plains of the wheels.

Figure 1:
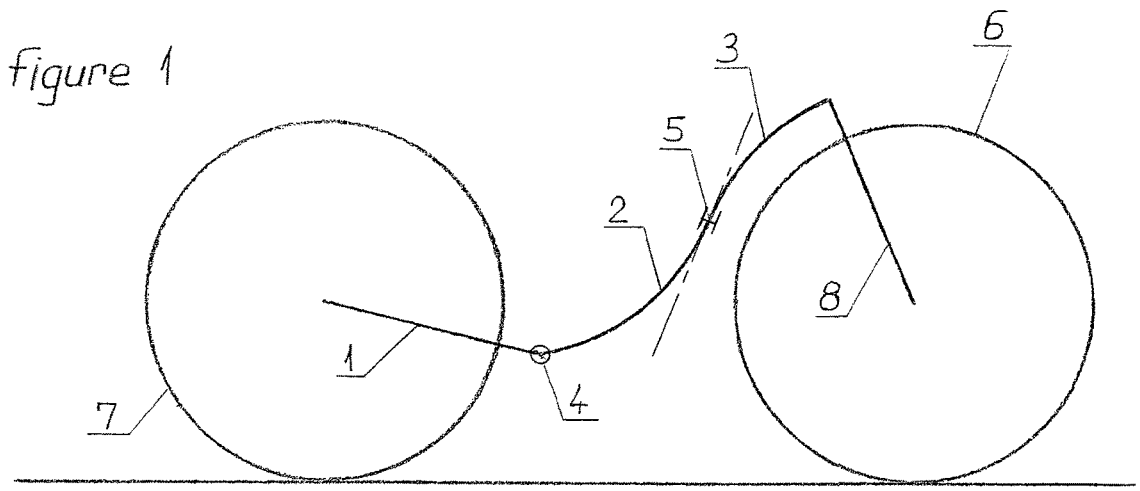
FIG. 1, 2, 3: Schematic figure showing the collapsing method of the bike (the main claim).
Figure 2:
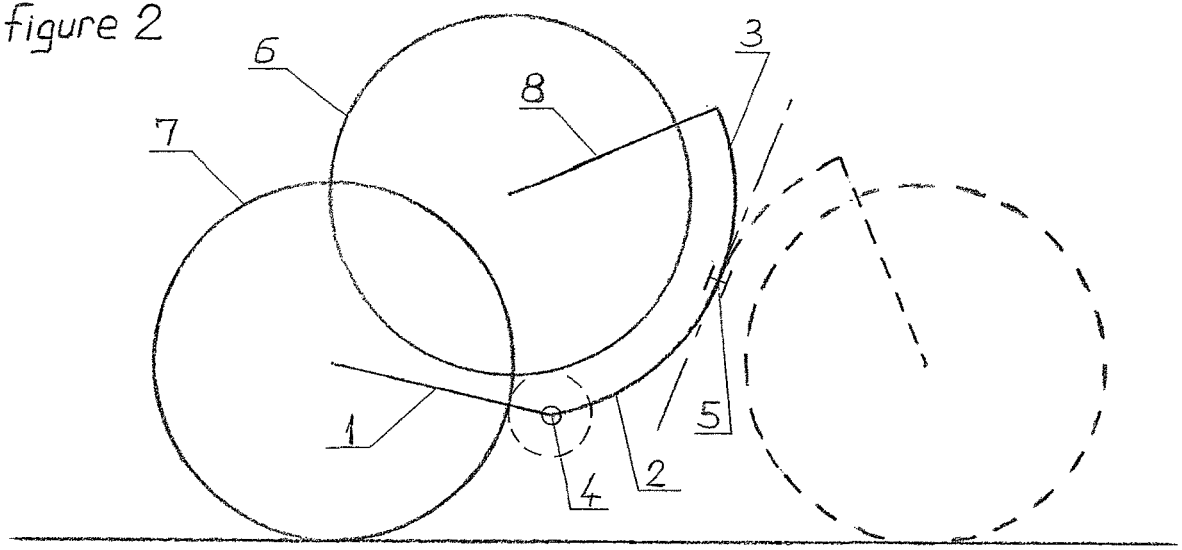
Figure 3:
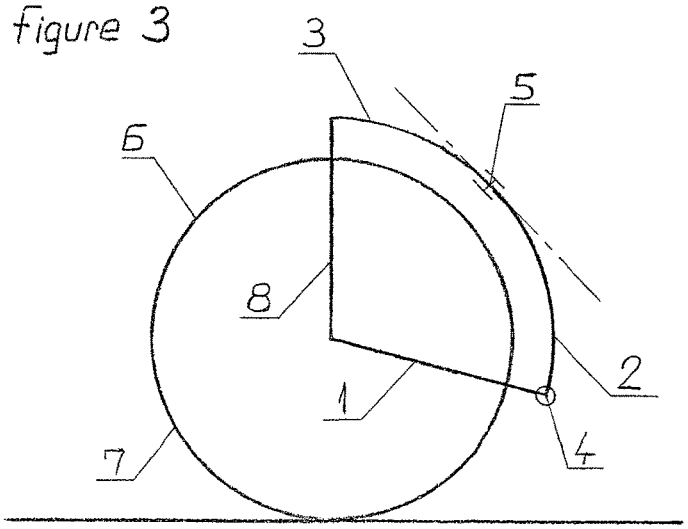
Figure 4:
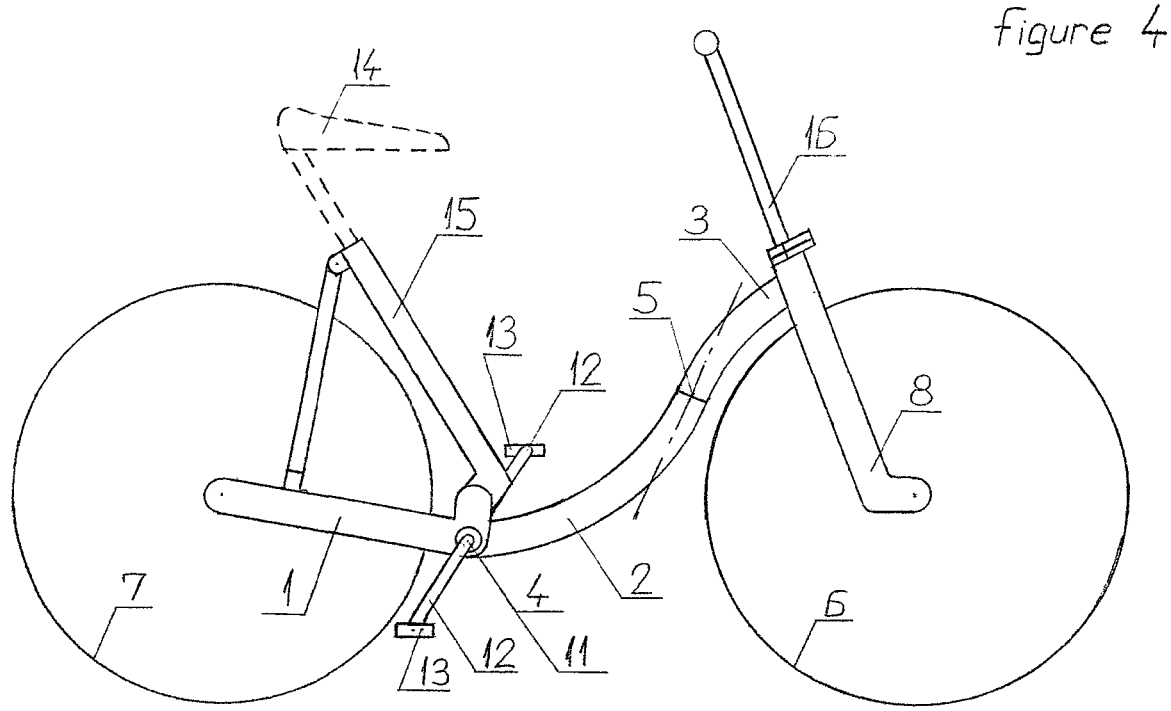
FIG. 4, 5, 6, 7: Example for a complete bicycle showing the main and some sub-claims.
Figure 5:
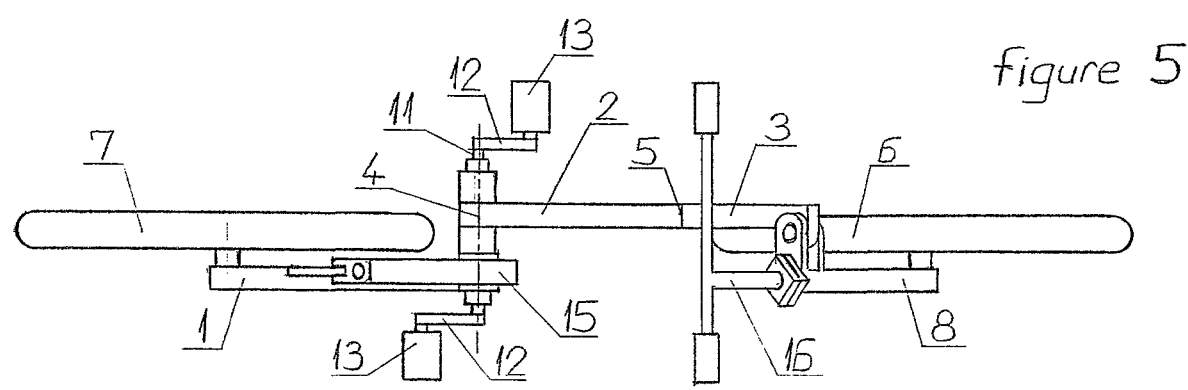
Figure 19:
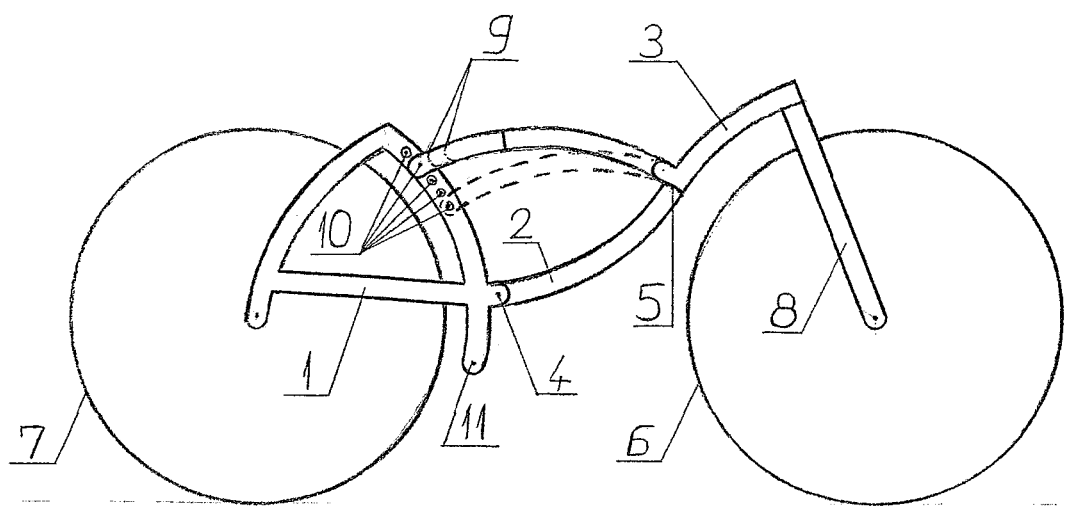
FIG. 19, 20: Shows one of the sub-claims the frame-brace (9).
Figure 20:
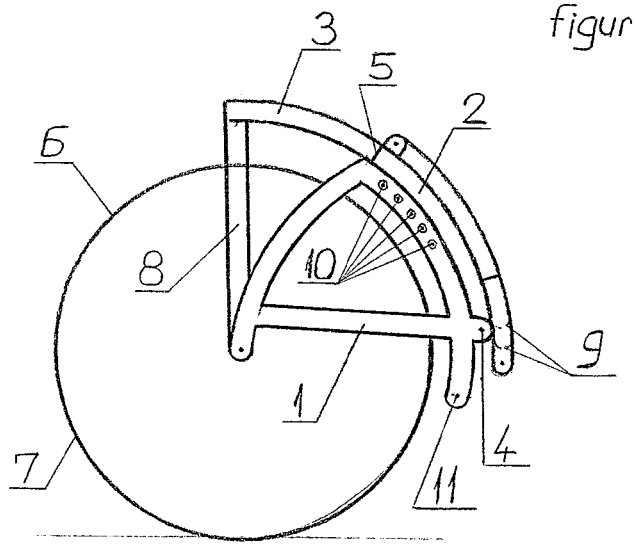
Figure 24:
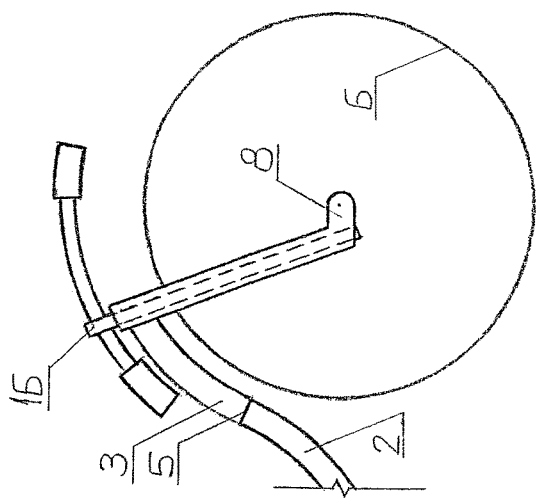
Figure 23:
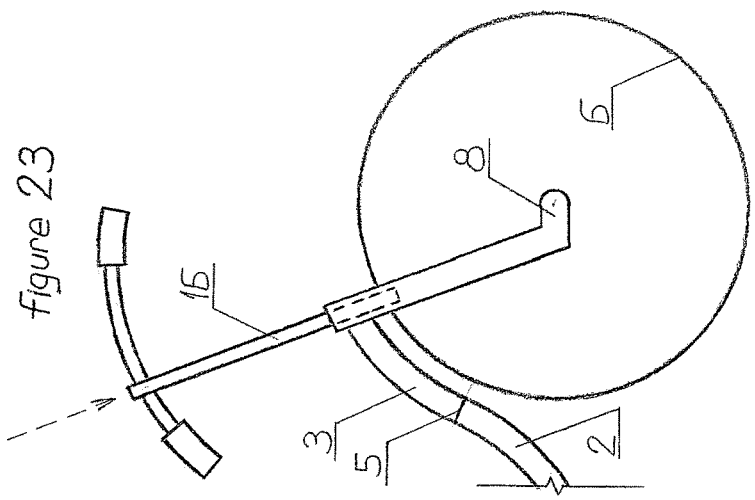
Figure 21:
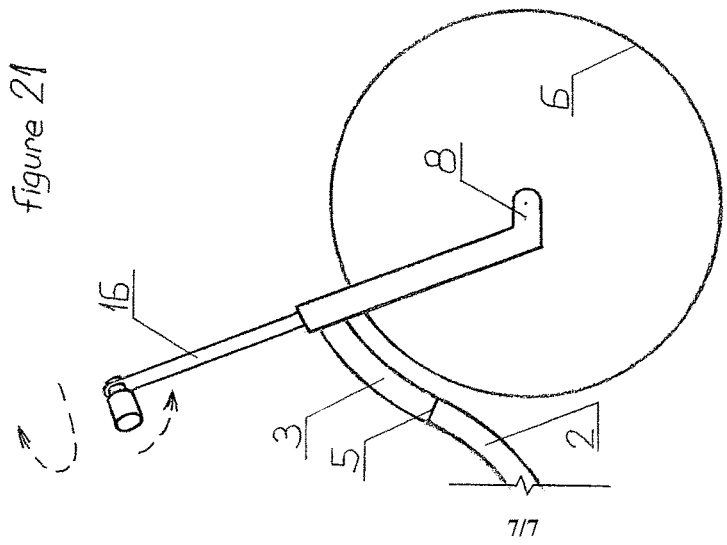
FIG. 21, 22, 23, 24: Shows one of the sub-claims the slidable stem (16).
Figure 22:
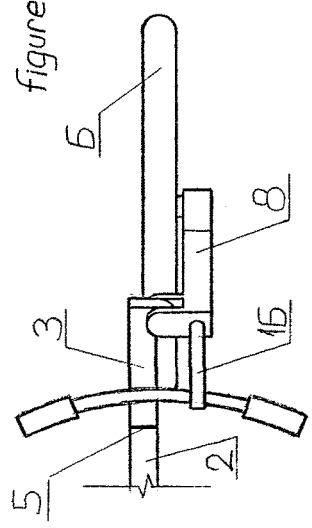

The invention claimed is:

1. A bicycle collapsible about multiple axes comprising three frame-segments:
    a steering-frame-segment comprising a steering frame (3) connected in a turnable manner to a steering wheel assembly including a stem (16), and a steering-wheel (6), configured to have one or two sided suspension by means of a fork/forks (8);
    a driving-frame-segment comprising a driving frame (1), and a driving-wheel (7), configured to have one or two sided suspension and
    a central-frame-segment comprising a central frame (2), which connects the driving-frame-segment and the steering-frame-segment,
    characterized in that
    the central-frame (2) and the driving-frame (1) are connected to each other in a releasably fixed manner and are pivotable above a pivot-axis (4), which pivot-axis (4) is perpendicular to the plane of parallelly positioned wheels (6), (7), or forms an angle of maximum 45 degree with this perpendicular, and
    the central-frame (2) and the steering-frame (3) are connected to each other and turnable along a flip-axis (5), which flip-axis (5) is in the plane of the parallelly positioned wheels (6), (7), or is parallel to this plane, or forms an angle of maximum 45 degrees with this plane.

2. Collapsible bicycle according to claim 1, characterized in that the connection of the central-frame (2) with the steering-frame (3) is a releasably fixed connection.

3. Collapsible bicycle according to claim 1, characterized in that a saddle (14) is connected to the driving-frame (1) by a seatpost (15).

4. Collapsible bicycle according to claim 1, characterized in that a saddle (14) is connected to the central-frame-segment (2) by a seatpost (15).

5. Collapsible bicycle according to claim 1, characterized in that a crank-shaft (11), with the crank-arms (12) and pedals (13) are comprised by the driving-frame-segment.

6. Collapsible bicycle according to claim 1, characterized in that a crank-shaft (11), with the crank-arms (12) and pedals (13) are comprised by the central-frame-segment.

7. Collapsible bicycle according to claim 1, characterized in that the flip axis (5) is inside the frames (2), (3), but the frames (2), (3) or sections thereof where the flip-axis (5) is located are outside of the plane of the parallelly positioned wheels (6), (7).

8. Collapsible bicycle according to claim 1, characterized in that the frame section where the flip-axis (5) is located is out of the plane of the parallelly positioned wheels (6), (7), and the frames (2), (3), or sections thereof where the flip-axis (5) is located, are bifurcated such that one frame-branch incorporates the pivoting flip-axis (5), while the other frame-branch is designed with a releasable fixing at the connection of the frames (2), (3).

9. Collapsible bicycle according to claim 1, characterized in that the frame section where the flip-axis (5) is located is out of the plane of the parallelly positioned wheels (6), (7), but the central-frame (2), and the steering-frame (3) are aligned with that plane.

10. Collapsible bicycle according to claim 1, characterized in that the central-frame (2) and the driving-frame (1) are configured to be offset along the pivot-axis (4).

11. Collapsible bicycle according to claim 1, characterized in that the steering-wheel (6) is designed to be pivotable in relation to the steering-frame (3) along an axis which is out of the plane of the steering wheel (6) itself, which axis is of one of the forks' (8) or a different one parallel or close to parallel to the fork (8).

12. Collapsible bicycle according to claim 1, characterized in that the bicycle is designed with an extra frame-brace (9) to increase stiffness of the bicycle, which frame-brace (9) connects the driving-frame-segment either with the central-frame-segment, or with the steering-frame-segment, with pivotable connection on one end, and releasable fixing on the other end; or with releasable fixings on both ends.

13. Collapsible bicycle according to claim 12, characterized in that the frame-brace (9) is configured to be fixed to the driving-frame (1) in multiple positions on alternative frame-brace fixing points (10).

14. Collapsible bicycle according to claim 12, characterized in that the frame-brace (9) consist of two or more pieces sliding longitudinally into or along each other for suitable length adjustment.

15. Collapsible bicycle according to claim 12, characterized in that the frame-brace (9) is suitable for fixing a saddle (14), or a structure incorporating the saddle (14), or a seatpost (15).

16. Collapsible bicycle according to claim 1, characterized in that crank-arms (12) mounted on both ends of a crank-shaft (11) are connected to it with releasable fixing and the crank-arms (12) are configured to be re-fixed even at an angle of less than 180 degrees to each-other which is their normal position.

17. Collapsible bicycle according to claim 1, characterized in that a seatpost (15) is configured to run even out of the plane of the parallelly positioned wheels (6), (7) when the bicycle is in an unfolded position.

18. Collapsible bicycle according to claim 1, characterized in that the stem (16) runs out of the plane of the steering wheel (6), and is configured to be slid into one of the forks (8) of the steering-wheel (6), or to be slid beside one of the forks (8).

19. Collapsible bicycle according to claim 1, characterized in that one or both crank-arms (12) are configured to be re-fixed on a crank-shaft (11) even with pedals (13) inward.

* * * * *